(12) United States Patent
Nguyen Canh et al.

(10) Patent No.: US 12,548,201 B2
(45) Date of Patent: Feb. 10, 2026

(54) CONNECTIVITY CODING FOR SYMMETRY MESH

(71) Applicant: TENCENT AMERICA LLC, Palo Alto, CA (US)

(72) Inventors: Thuong Nguyen Canh, San Bruno, CA (US); Xiaozhong Xu, State College, PA (US); Joel Jung, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 270 days.

(21) Appl. No.: 18/312,722

(22) Filed: May 5, 2023

(65) Prior Publication Data
US 2024/0127490 A1 Apr. 18, 2024

Related U.S. Application Data

(60) Provisional application No. 63/409,938, filed on Sep. 26, 2022.

(51) Int. Cl.
| | |
|---|---|
| G06T 9/00 | (2006.01) |
| G06T 9/20 | (2006.01) |
| H04N 19/119 | (2014.01) |
| H04N 19/167 | (2014.01) |
| H04N 19/50 | (2014.01) |
| H04N 19/88 | (2014.01) |

(52) U.S. Cl.
CPC ............... *G06T 9/001* (2013.01); *G06T 9/20* (2013.01); *H04N 19/119* (2014.11); *H04N 19/167* (2014.11); *H04N 19/50* (2014.11); *H04N 19/88* (2014.11)

(58) Field of Classification Search
CPC .... H04N 19/119; H04N 19/167; H04N 19/50; H04N 19/88; G06T 9/20; G06T 9/001
See application file for complete search history.

(56) References Cited

U.S. PATENT DOCUMENTS

| | | |
|---|---|---|
| 2013/0057550 A1 | 3/2013 | Kishikawa et al. |
| 2017/0177771 A1* | 6/2017 | Letzelter ................. G06F 30/23 |
| 2019/0259184 A1 | 8/2019 | Ostermann et al. |

(Continued)

OTHER PUBLICATIONS

"A Distance-Based Compression of 3D Meshes for Mobile Devices"—Kim et al., IEEE Transactions on Consumer Electronics, vol. 54, No. 3, Aug. 2008. (Year: 2008).*

(Continued)

*Primary Examiner* — Mainul Hasan
(74) *Attorney, Agent, or Firm* — Sughrue Mion, PLLC

(57) ABSTRACT

A method of encoding includes receiving a polygon mesh comprising a plurality of faces and a plurality vertices; separating the polygon mesh into a left side half mesh and a right side half mesh by a plane; extracting the left side half mesh comprising a first plurality of vertices in-plane and on a left side of the polygon mesh; remapping the plurality of faces to represent a new vertices order in order to generate a plurality of remapped faces; extracting the plurality of remapped faces; compressing the left side half mesh by a codec; predicting a location of a second plurality of vertices on the right side half mesh using a symmetry based prediction on the compressed left side half mesh; and connecting the left side half mesh and the right side half mesh.

20 Claims, 6 Drawing Sheets

(56) References Cited

U.S. PATENT DOCUMENTS

| | | | |
|---|---|---|---|
| 2020/0111237 A1* | 4/2020 | Tourapis | G06T 9/001 |
| 2020/0265611 A1* | 8/2020 | Hemmer | G06T 9/001 |
| 2023/0290011 A1* | 9/2023 | Kim | G06T 17/20 |
| 2024/0242391 A1* | 7/2024 | Zakharchenko | H04N 19/46 |
| 2024/0289997 A1* | 8/2024 | Zakharchenko | G06T 9/001 |

OTHER PUBLICATIONS

"Benchmarking Open-Source Static 3D Mesh Codecs for Immersive Media Interactive Live Streaming"—Doumanoglou et al., IEEE Journal on Emerging and Selected Topics in Circuits and Systems, vol. 9, No. 1, Mar. 2019 (Year: 2019).*

"Hierarchical Representation and Coding of 3D Mesh Geometry"—Celasun et al., 1-4244-0481-9/06/$20.00 C2006 IEEE (Year: 2006).*

Khaled Mammou et al., "[V-CG] Apple's Dynamic Mesh Coding CfP Response", International Organisation for Standardisation Organisation Internationale de Normalisation, ISO/IEC JTC 1/SC 29/WG 7 Coding of Moving Pictures and Audio, ISO/IEC JTC 1/SC 29/WG 7 m59281, Online—Apr. 2022, 24 pages.

International Search Report dated Aug. 15, 2023 in Application No. PCT/US 23/23298.

Written Opinion of the International Search Authority dated Aug. 15, 2023 in Application No. PCT/US23/23298.

* cited by examiner

CONNECTIVITY CODING FOR SYMMETRY MESH

CROSS-REFERENCE TO RELATED APPLICATION

This application claims priority from U.S. Provisional Application No. 63/409,938 filed on Sep. 26, 2022, the disclosure of which is incorporated herein by reference in its entirety.

FIELD

This disclosure is directed to a set of advanced video coding technologies. More specifically, the present disclosure is directed to symmetry-based mesh coding by separating a mesh by a plane with added vertices and edges.

BACKGROUND

Advanced three-dimensional (3D) representations of the world are enabling more immersive forms of interaction and communication. To achieve realism in 3D representations, 3D models are becoming ever more sophisticated, and a significant amount of data is linked to the creation and consumption of these 3D models. 3D meshes are widely used to 3D model immersive content.

A 3D mesh may be composed of several polygons that describe the surface of a volumetric object. A dynamic mesh sequence may require a large amount of data since the mesh sequence may have a significant amount of information changing over time. Therefore, efficient compression technologies are required to store and transmit such contents.

VMesh is an ongoing MPEG standard to compress the static and dynamic meshes. The current VMesh reference software separates an input mesh into a simplified base mesh and displacement vectors, which are coded independently.

Symmetry is a property of a geometry object when an operation maps the object to itself. In an Euclidean metric, a group of symmetry transform is named Euclidean isometry consisting of reflection, translation, rotation, and their combinations. Among all these properties, reflection symmetry or bilateral symmetry is the most common symmetry that exists in both the biological and non-biological world. All points and edges of a reflection symmetry mesh have a one-to-one correspondence via a symmetrical plane.

Reflection symmetry plane of a mesh may be detected with simple methods with principal component analysis (PCA) or more advanced techniques using deep learning. Surface reflection symmetry is when only a surface of a mesh exhibits reflection symmetry, but not xyz points or vertices. Therefore, in this situation, one-to-one mapping may not available.

SUMMARY

According to one or more embodiments, a method of video encoding performed by at least one processor includes receiving a polygon mesh comprising a plurality of faces and a plurality of vertices. The method further includes separating the polygon mesh into a left side half mesh and a right side half mesh by a plane. The method further includes extracting the left side half mesh comprising a first plurality of vertices in-plane and on a left side of the polygon mesh. The method further includes remapping the plurality of faces to represent a new vertices order in order to generate a plurality of remapped faces. The method further includes extracting the plurality of remapped faces. The method further includes compressing the left side half mesh by a codec. The method further includes predicting a location of a second plurality of vertices on the right side half mesh using a symmetry based prediction on the compressed left side half mesh. The method further includes connecting the left side half mesh and the right side half mesh.

According to one or more embodiments, an apparatus includes: at least one memory configured to store program code, and at least one processor configured to read the program code and operate as instructed by the program code. The program code includes receiving code configured to cause the at least one processor to receive a polygon mesh comprising a plurality of faces and a plurality of vertices. The program code further includes separating code configured to cause the at least one processor to separate the polygon mesh into a left side half mesh and a right side half mesh by a plane. The program code further includes first extracting code configured to cause the at least one processor to extract the left side half mesh comprising a first plurality of vertices in-plane and on a left side of the polygon mesh. The program code further includes remapping code configured to cause the at least one processor to remap the plurality of faces to represent a new vertices order in order to generate a plurality of remapped faces. The program code further includes second extracting code configured to cause the at least one processor to extract the plurality of remapped faces. The program code further includes compressing code configured to cause the at least one processor to compress the left side half mesh by a codec. The program code further includes predicting code configured to cause the at least one processor to predict a location of a second plurality of vertices on the right side half mesh using a symmetry based prediction on the compressed left side half mesh. The program code further includes connecting code configured to cause the at least one processor to connect the left side half mesh and the right side half mesh.

According to one or more embodiments, a non-transitory computer readable medium having instructions stored therein, which, when executed by at least one processor in an encoder, causes the at least one processor to receive a polygon mesh comprising a plurality of faces and a plurality of vertices. The instructions further cause the at least one processor to separate the polygon mesh into a left side half mesh and a right side half mesh by a plane. The instructions further cause the at least one processor to extract the left side half mesh comprising a first plurality of vertices in-plane and on a left side of the polygon mesh. The instructions further cause the at least one processor to remap the plurality of faces to represent a new vertices order in order to generate a plurality of remapped faces. The instructions further cause the at least one processor to extract the plurality of remapped faces. The instructions further cause the at least one processor to compress the left side half mesh by a codec. The instructions further cause the at least one processor to predict a location of a second plurality of vertices on the right side half mesh using a symmetry based prediction on the compressed left side half mesh. The instructions further cause the at least one processor to connect the left side half mesh and the right side half mesh.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
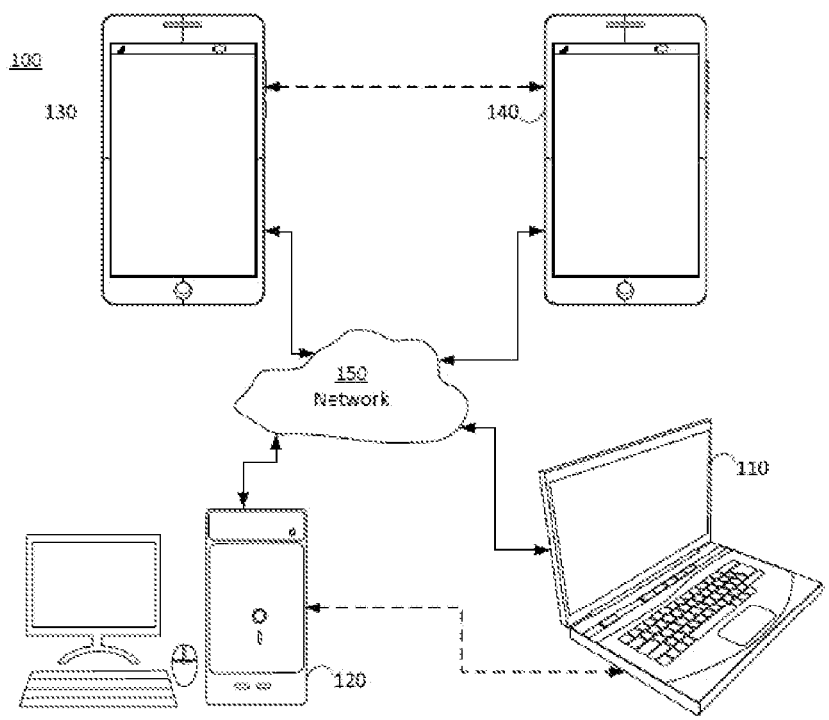
FIG. 1 is a schematic illustration of a block diagram of a communication system, in accordance with embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Reflection symmetry is a popular characteristic of mesh, especially computer generated meshes. Symmetry was utilized to compress symmetry mesh. Vertices are divided into left and right part of the symmetry plane. The left part is encoded by mesh coding while the right part is encoded by a symmetry prediction and displacement coding.

The proposed methods may be used separately or combined in any order and may be used for polygon meshes. A polygon mesh may refer to a 3D mesh including several polygons that describe the surface of a volumetric object. The vertices of a polygon mesh in 3D space and the information of how the vertices are connected may define each polygon, referred to as connectivity information. Vertex attributes, such as colors, normals, etc., may be associated with the mesh vertices. It is proposed to encode the connectivity for symmetry-based mesh coding by predicting symmetry connectivity and handling cross symmetry plane connectivity. A method to separate a plane by adding vertices is presented.

Figure 2:
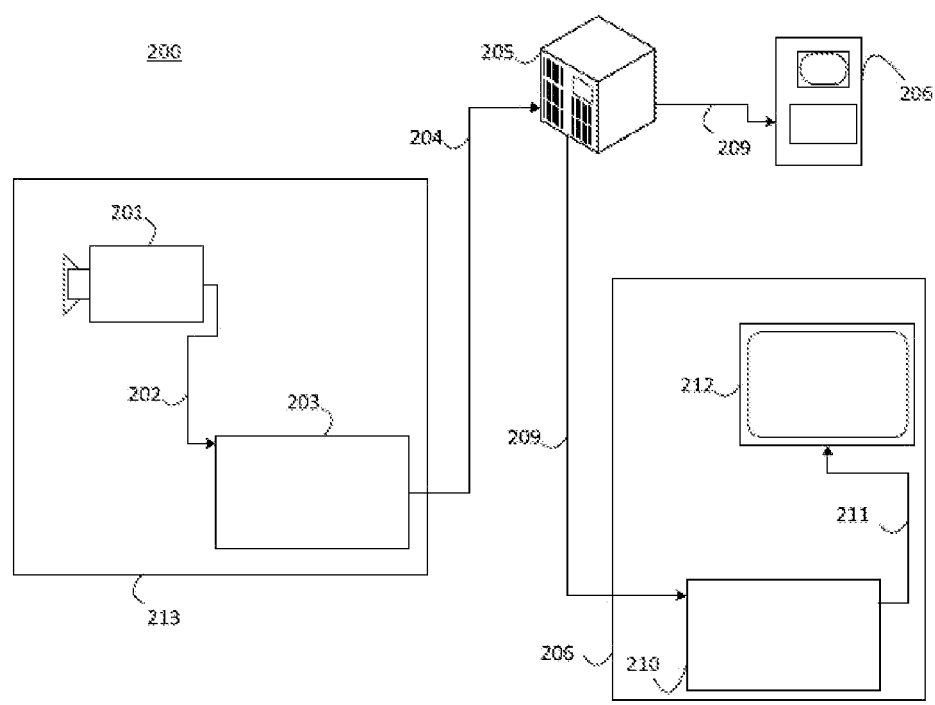
FIG. 2 is a schematic illustration of a block diagram of a streaming system, in accordance with embodiments of the present disclosure.

With reference to FIGS. 1 and 2, one or more embodiments of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. A 3D mesh may be composed of several polygons that describe the surface of a volumetric object. For example, the 3D mesh may contain a plurality of vertices in a 3D space where each vertex is associated with a 3D coordinate (e.g., x, y, z). The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, may be stored on a streaming server 205 for future use. One or more streaming clients 206 may access the streaming server 205 to retrieve video bit streams 209 that may be copies of the encoded video bitstream 204.

The streaming clients 206 may include a video decoder 210 and a display 212. The video decoder 210 may, for example, decode video bitstream 209, which is an incoming copy of the encoded video bitstream 204, and create an outgoing video sample stream 211 that may be rendered on the display 212 or another rendering device (not depicted). In some streaming systems, the video bitstreams 204, 209 may be encoded according to certain video coding/compression standards.

According to one or more embodiments, a general framework to compress the symmetry connectivity is described.

Assuming a symmetry mesh $\mathcal{M}$ with n vertices and m faces has a symmetry plane p: $ax+by+cz=d$, a vertex $v_i:[x_i, y_i, z_i]$ in $\mathcal{M}$ may be classified as left vertex, right vertex, or in-plane vertex. Correspondingly, a face $f_j: [v_1^j, \ldots, v_K^j]$ is a set of K vertices describing the connectivity which also may be divided into left face, right face, or cross symmetry plane face. In the wavefront format, a face is represented by a set of indices of corresponding vertices as $f_{id}: [id_1, \ldots, id_K]$. Table 1 presents the classification of vertices in symmetry mesh.

TABLE 1

| Type | Classifies | Condition ($\forall i \in [1, n]$, $\forall j \in [1, m]$) |
|---|---|---|
| Vertices | In-plane | $\mathcal{V}_J = \{v_1 \mid abs(ax_i + by_i + cz_i - d) \leq \tau_{inplane}\}$ |
|  | Left | $\mathcal{V}_\mathcal{L} = \{v_1 \mid (ax_i + by_i + cz_i) \leq d, \text{ and } v_i \notin \mathcal{V}_J\}$ |
|  | Right | $\mathcal{V}_\mathcal{R} = \{v_1 \mid (ax_i + by_i + cz_i) \geq d, \text{ and } v_i \notin \mathcal{V}_J\}$ |
|  | Keep | $\mathcal{V}_\mathcal{K} = \mathcal{V}_J \cup \mathcal{V}_\mathcal{L}$ |
| Faces | Cross | $\mathcal{F}_\mathcal{C} = \{f_j \mid num(f_j \cap \mathcal{V}_\mathcal{L}) \times num(f_j \cap \mathcal{V}_\mathcal{R}) > 0\}$ |
|  | Left | $\mathcal{F}_\mathcal{L} = \{f_j \mid num(f_j \cap \mathcal{V}_\mathcal{K}) = 0\}$ |
|  | Right | $\mathcal{F}_\mathcal{C} = \{f_j \mid num(f_j \cap \mathcal{V}_\mathcal{R}) = 0\}$ |

Notation num(•) denotes the number of elements in a set, abs(•) is the absolute operator, and $\tau_{inplane}$ is the threshold to find an in-plane vertex. To encode the symmetry mesh with both vertices and faces, several o are performed as follows.

In some embodiments, in-plane and left vertices are kept $$\mathcal{V}_\mathcal{K} = \mathcal{V}_J \cup \mathcal{V}_\mathcal{L}. \tag{1}$$

assuming there are $n_J$ in-plane vertices and $n_\mathcal{L}$ left vertices. By extracting the half mesh, the vertices will have new indexes from 1 to $n_J + n_\mathcal{L}$. All the right vertices are removed: they are assumed to have new indexes from $n_J + n_\mathcal{L} + 1$ to n. Therefore, a mapping of the old index i to the new index j may be represented by an operator $j = \mathcal{P}(i)$. In some embodiments, the faces are remapped to represent new vertices order.

$$\hat{f}_i = \mathcal{P}(f_i) \tag{2}$$

In some embodiments, left and cross faces are expected to be kept. However, cross faces contain right vertices which have been removed. Therefore, it cannot be compressed directly. Methods for handling face extraction are given in later embodiment.

In some embodiments, the half mesh is compressed by a codec, such as Draco. The signaling for the symmetry plane and additional information is required. Additional displacement coding may be implemented for the right vertices.

Figure 3:
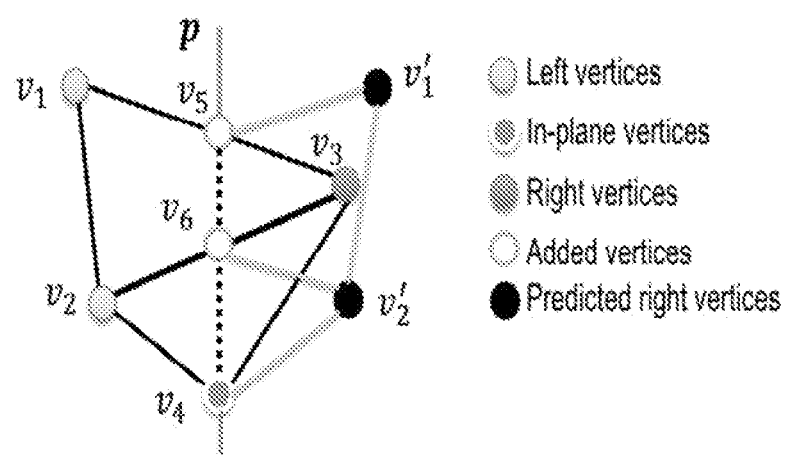
FIG. 3 is an illustration showing symmetry vertices and connectivity prediction, in accordance with embodiments of the present disclosure.

In some embodiments, mesh coding may not maintain the order of vertices. Therefore, a reordering processing may be applied with left vertices first then in-plane vertices. A symmetry prediction for a l-th left vertex $v_l$, will return a r-th right vertex $v_r$ as $$v_r = \text{SymPred}(v_l, p), v_l \in \mathcal{V}_\mathcal{L} \tag{3}$$

with SymPred(•) denoting the symmetry operator. The symmetry prediction is only applied to the left vertices as in FIG. 3.

All the predicted right vertices have index of its corresponding left symmetry pair plus an offset of $n_\mathcal{L} + n_J$ as $$r = l + n_\mathcal{L} + n_J \tag{4}$$

In addition, the normal of right face is opposite to the normal of the left face. Therefore, the prediction of right symmetry faces is flipped in the order of predicted vertices as $$\hat{f}_r = \text{Flip}\{\text{SymPred}(\hat{f}_l, p)\}. \tag{5}$$

Notation Flip{•} denotes the operator to reverse the order of elements in the set.

In some embodiments, to complete the reconstruction of the mesh, left side and predicted right side need to be connected. Methods for connecting cross faces are given in 5 later embodiment.

Figure 4:
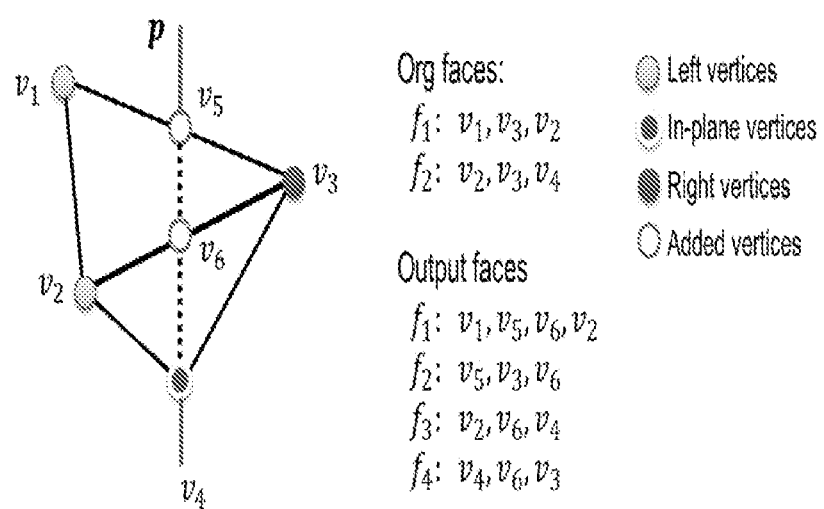
FIG. 4 is an illustration showing an example for added vertices and faces, in accordance with embodiments of the present disclosure.

In one or more embodiments, a method to separate a mesh by a plane is proposed. The method is used to handle cross faces in Face Extraction by adding vertices. New vertices and edges at the intersection of cross symmetry faces and symmetry plane are added to the input mesh before performing the symmetry extraction. By doing so, there is no longer crossing faces, thus no need to signal and connect two side meshes. An illustration for these added vertices and edges is given in FIG. 4.

The method to derive new vertices and faces is given as follow.

TABLE 2

Input: a mesh symmetry plane p, vertices and faces sets:
$\mathcal{V}, \mathcal{V}_{\mathcal{K}}, \mathcal{V}_{\mathcal{R}}, \mathcal{F}_{C}, \mathcal{F}_{L}, \mathcal{F}_{R}$
for f = {$v_1$, ..., $v_K$} in $\mathcal{F}_C$ {          // for each face crossing the plan
  Init $f_{new}$ = {$v_1$}
  for i from 1 to K − 1 {
    if ($v_i \in \mathcal{V}_{\mathcal{K}}$ & $v_{i+1} \in \mathcal{V}_{\mathcal{R}}$) or          // if the connection
    ($v_i \in \mathcal{V}_{\mathcal{R}}$ & $v_{i+1} \in \mathcal{V}_{\mathcal{K}}$) {                              crosses the plane
      $v_{new}$ = PlaneLineCollision($v_i$, $v_{i+1}$,p)
      if $v_{new} \notin \mathcal{V}$ {
        $\mathcal{V} = \mathcal{V} \cup v_{new}$                            // add new vertex to set
      }
      $f_{new}$ = {$f_{new}$, $v_{new}$, $v_{i+1}$}      // add new vertex to faces
    } else {
      $f_{new}$ = {$f_{new}$, $v_{i+1}$}
    }
  }
  if num($f_{new}$) > K {                   // split faces and add new edges
    $f_{left}$ = {$v_i | v_i \in f_{new}$ and $v_1 \notin \mathcal{V}_R$}    // Note: remain the same order
    $f_{right}$ = {$v_i | v_i \in f_{new}$ and $v_1 \notin \mathcal{V}_L$}
    f = $f_{left} \cup f_{right}$
  }
  $\mathcal{F}_L = \mathcal{F}_L \cup$ f
}
Output: mesh with vertices set $\mathcal{V}$ and faces set $\mathcal{F}$ = { $\mathcal{F}_L, \mathcal{F}_R$ }

The operation PlaneLineCollision($v_i$, $v_{i+1}$, p) is to find the collision point between plane p and two vertices $v_i$, $v_{i+1}$.

In some embodiments, the face is the index of vertices in wavefront format as f=[$id_1$, . . . , $id_K$] and $\bar{\mathcal{V}}$ is the corresponding index set of vertices set $\mathcal{V}$. The algorithm is adjusted to keep track of the new and current vertex indexes as follows.

TABLE 3

Input: a mesh with symmetry plane p, vertices and faces sets:
$\mathcal{V}, \mathcal{V}_{\mathcal{K}}, \mathcal{V}_{\mathcal{R}}, \mathcal{F}_{C}, \mathcal{F}_{L}, \mathcal{F}_{R}$
with corresponding faces set index $\bar{\mathcal{V}}, \bar{\mathcal{V}}_{\mathcal{K}}, \bar{\mathcal{V}}_{\mathcal{R}}$
Init: vert_id = num($\mathcal{V}_{\mathcal{K}}$) + 1
for f = {$id_1$, ..., $id_K$} in $\mathcal{F}_C$ {
  Init $f_{new}$ = {$id_1$}
  for i from 1 to K − 1 {
    if ($id_i \in \bar{\mathcal{V}}_{\mathcal{K}}$ & $id_{i+1} \in \bar{\mathcal{V}}_R$) or ($id_i \in \bar{\mathcal{V}}_R$ & $id_{i+1} \in \bar{\mathcal{V}}_{\mathcal{K}}$) {
      $v_{new}$ = PlaneLineCollision($\mathcal{V}[id_1]$, $\mathcal{V}[id_{i+1}]$,p)
      if $v_{new} \notin \bar{\mathcal{V}}$ {
        $\bar{\mathcal{V}}$ = Append($\bar{\mathcal{V}}$, $v_{new}$)      // add new vertex to set
        cur_vert_id = vert_id
        vert_id += 1
      } else {
        cur_vert_idx = FindIndex($\mathcal{V}_{\mathcal{K}}$, $v_{new}$)
      }
      $f_{new}$ = {$f_{newid}$, cur_vert_id, $id_{i+1}$}
    } else {

TABLE 3-continued $f_{new}$ = {$f_{newid}$, $id_{i+1}$}
    }
  }
  if num($f_{new}$) > K {           // split faces and add new edges
    $f_{left}$ = {$v_i | v_i \in f_{new}$           // Note: remain the same order
      and $v_i \notin \mathcal{V}_R$}
    $f_{right}$ = {$v_i | v_i \in f_{new}$ and $v_i \notin \mathcal{V}_L$}
    f = $f_{left} \cup f_{right}$
  }
  $\mathcal{F}_L = \mathcal{F}_L \cup$ f
}
Output: mesh with vertices set $\mathcal{V}$ and faces set $\mathcal{F}$ = { $\mathcal{F}_L, \mathcal{F}_R$ }

Figure 5:
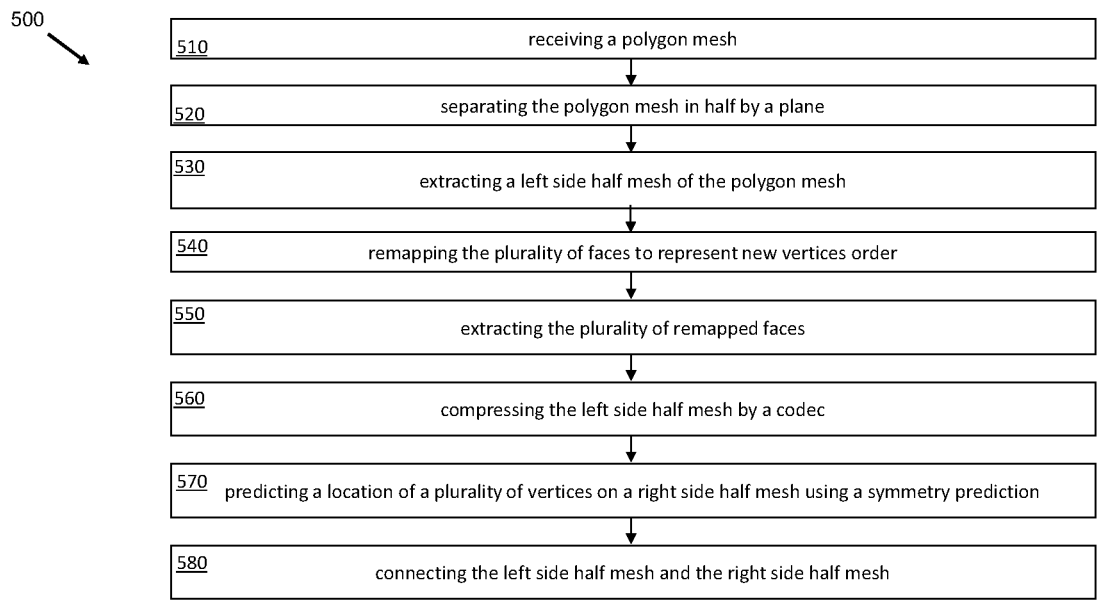
FIG. 5 is operational flowchart illustrating the steps carried out by a program for symmetry-based mesh coding by separating a mesh by a plane with added vertices and edges, in accordance with embodiments of the present disclosure.

FIG. 5 is a flowchart of example process 500 for symmetry-based mesh coding by separating a mesh by a plane with added vertices and edges. In some implementations, one or more process blocks of FIG. 5 may be performed by any of the elements discussed above.

As shown in FIG. 5, process 500 may include receiving a polygon mesh comprising a plurality of faces and a plurality of vertices (block 510).

As further shown in FIG. 5, the process 500 may include separating the polygon mesh in half by a plane (block 520).

As further shown in FIG. 5, the process 500 may include extracting a left side half mesh of the polygon mesh, the left side half mesh comprising a first plurality of vertices in-plane and on a left side of the polygon mesh (block 530).

As further shown in FIG. 5, the process 500 may include remapping the plurality of faces to represent new vertices order in order to generate a plurality of remapped faces (block 540).

As further shown in FIG. 5, the process 500 may include extracting the plurality of remapped faces (block 550).

As further shown in FIG. 5, the process 500 may include compressing the left side half mesh by a codec (block 560).

As further shown in FIG. 5, the process 500 may include predicting a location of a second plurality of vertices on a right side half mesh using a symmetry prediction based on the compressed left side half mesh (block 570).

As further shown in FIG. 5, the process 500 may include connecting the left side half mesh and the right side half mesh (block 580).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The techniques, described above, may be implemented as computer software using computer-readable instructions and physically stored in one or more computer-readable media. For example, FIG. 6 shows a computer system 900 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 6:
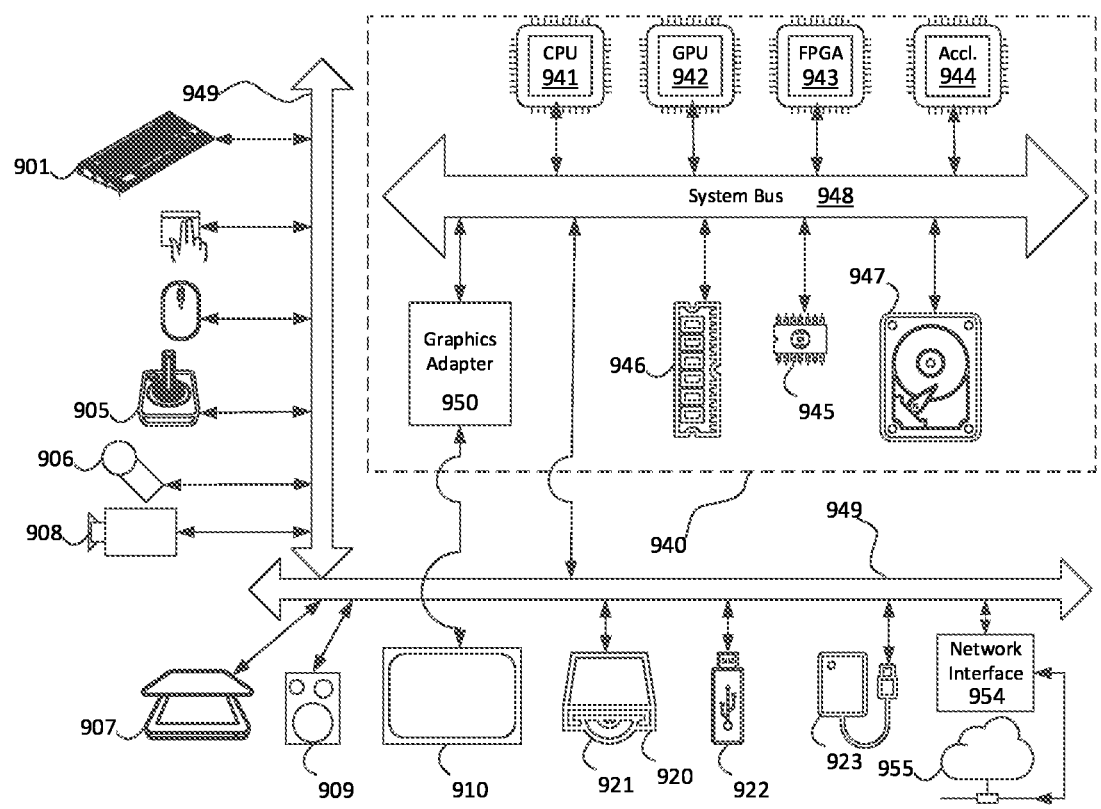
FIG. 6 is a diagram of a computer system suitable for implementing the embodiments of the present disclosure.

The components shown in FIG. 6 for computer system 900 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, and camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch screen 910, data glove, or joystick 905, but there may also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 may also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 may also include interface to one or more communication networks. Networks may for example be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 955. Certain protocols and protocol stacks may be used on each of those networks and network interfaces as described above.

Aforementioned human interface devices, human-accessible storage devices, and network interfaces 954 may be attached to a core 940 of the computer system 900.

The core 940 may include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 may be accessible in the form of one or more physical plugs to enable extensions by additional CPUs, GPU, and the like. The peripheral devices may be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 may execute certain instructions that, in combination, may make up the aforementioned computer code. That computer code may be stored in ROM 945 or RAM 946. Transitional data may be also be stored in RAM 946, whereas permanent data may be stored for example, in the internal mass storage 947. Fast storage and retrieve to any of the memory devices may be enabled through the use of cache memory, that may be closely associated with one or more CPU 941, GPU 942, mass storage 947, ROM 945, RAM 946, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, a computer system having the architecture of computer system 900, and specifically the core 940 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 940 that are of non-transitory nature, such as core-internal mass storage 947 or ROM 945. The software implementing various embodiments of the present disclosure may be stored in such devices and executed by core 940. A computer-readable medium may include one or more memory devices or chips, according to particular needs. The software may cause the core 940 and specifically the processors therein (including CPU, GPU, FPGA, and the like)

to execute particular processes or particular parts of particular processes described herein, including defining data structures stored in RAM 946 and modifying such data structures according to the processes defined by the software. In addition or as an alternative, the computer system may provide functionality as a result of logic hardwired or otherwise embodied in a circuit (for example: accelerator 944), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video encoding performed by at least one processor, the method comprising:
   receiving a polygon mesh comprising a plurality of faces and a plurality of vertices;
   separating the polygon mesh into a left side half mesh and a right side half mesh by a plane;
   extracting the left side half mesh comprising a first plurality of vertices in-plane and on a left side of the polygon mesh;
   remapping the plurality of faces to represent a new vertices order in order to generate a plurality of remapped faces;
   extracting the plurality of remapped faces;
   compressing the left side half mesh by a codec;
   predicting a location of a second plurality of vertices on the right side half mesh using a symmetry based prediction on the compressed left side half mesh; and
   connecting the left side half mesh and the right side half mesh.

2. The method according to claim 1, further comprising determining a displacement for the second plurality of vertices.

3. The method according to claim 1, further comprising reordering the first plurality of vertices.

4. The method according to claim 1, wherein each face of the plurality of faces is represented by a set of indices of corresponding vertices.

5. The method according to claim 4, wherein the set of indices of corresponding vertices describe a connectivity between the plurality of faces, and
   wherein the connectivity is divided into left face, right face, or cross symmetry plane face.

6. The method according to claim 5, further comprising adding new vertices and new edges to the polygon mesh at an intersection of one or more cross symmetry faces and the plane.

7. The method according to claim 1, wherein the symmetry prediction further comprises:
   adding an offset to an index of each of the plurality of vertices on the right side half mesh; and
   flipping a prediction of one or more faces on the right side half mesh in an order of predicted vertices.

8. An apparatus comprising:
   at least one memory configured to store program code; and
   at least one processor configured to read the program code and operate as instructed by the program code, the program code including:
   receiving code configured to cause the at least one processor to receive a polygon mesh comprising a plurality of faces and a plurality of vertices;
   separating code configured to cause the at least one processor to separate the polygon mesh into a left side half mesh and a right side half mesh by a plane;
   first extracting code configured to cause the at least one processor to extract the left side half mesh comprising a first plurality of vertices in-plane and on a left side of the polygon mesh;
   remapping code configured to cause the at least one processor to remap the plurality of faces to represent a new vertices order in order to generate a plurality of remapped faces;
   second extracting code configured to cause the at least one processor to extract the plurality of remapped faces;
   compressing code configured to cause the at least one processor to compress the left side half mesh by a codec;
   predicting code configured to cause the at least one processor to predict a location of a second plurality of vertices on the right side half mesh using a symmetry based prediction on the compressed left side half mesh; and
   connecting code configured to cause the at least one processor to connect the left side half mesh and the right side half mesh.

9. The apparatus according to claim 8, further comprising determining code configured to cause the at least one processor to determine a displacement for the second plurality of vertices.

10. The apparatus according to claim 8, further comprising reordering code configured to cause the at least one processor to reorder the first plurality of vertices.

11. The apparatus according to claim 8, wherein each face of the plurality of faces is represented by a set of indices of corresponding vertices.

12. The apparatus according to claim 11, wherein the set of indices of corresponding vertices describe a connectivity between the plurality of faces, the connectivity is divided into left face, right face, or cross symmetry plane face.

13. The apparatus according to claim 12, further comprising adding code configured to cause the at least one processor to add new vertices and new edges to the polygon mesh at an intersection of one or more cross symmetry faces and the plane.

14. The apparatus according to claim 8, wherein the predicting code is further configured to cause the at least one processor to:
   add an offset to an index of each of the plurality of vertices on the right side half mesh; and
   flip a prediction of one or more faces on the right side half mesh in an order of predicted vertices.

15. A non-transitory computer readable medium having instructions stored therein, which, when executed by at least one processor in an encoder, cause the at least one processor to:
   receive a polygon mesh comprising a plurality of faces and a plurality of vertices;
   separate the polygon mesh into a left side half mesh and a right side half mesh by a plane;

extract the left side half mesh comprising a first plurality of vertices in-plane and on a left side of the polygon mesh;

remap the plurality of faces to represent a new vertices order in order to generate a plurality of remapped faces;

extract the plurality of remapped faces;

compress the left side half mesh by a codec;

predict a location of a second plurality of vertices on the right side half mesh using a symmetry based prediction on the compressed left side half mesh; and connect the left side half mesh and the right side half mesh.

16. The non-transitory computer readable medium according to claim 15, wherein the instructions further cause the at least one processor to determine a displacement for the second plurality of vertices.

17. The non-transitory computer readable medium according to claim 15, wherein the instructions further cause the at least one processor to reorder the first plurality of vertices.

18. The non-transitory computer readable medium according to claim 15, wherein each face of the plurality of faces is represented by a set of indices of corresponding vertices.

19. The non-transitory computer readable medium according to claim 18, wherein the set of indices of corresponding vertices describe a connectivity between the plurality of faces, the connectivity is divided into left face, right face, or cross symmetry plane face.

20. The non-transitory computer readable medium according to claim 19, wherein the instructions further cause the at least one processor to add new vertices and new edges to the polygon mesh at an intersection of one or more cross symmetry faces and the plane.

* * * * *